No. 868,464. PATENTED OCT. 15, 1907.
A. S. MANN.
CONTROL SYSTEM.
APPLICATION FILED DEC. 18, 1905.
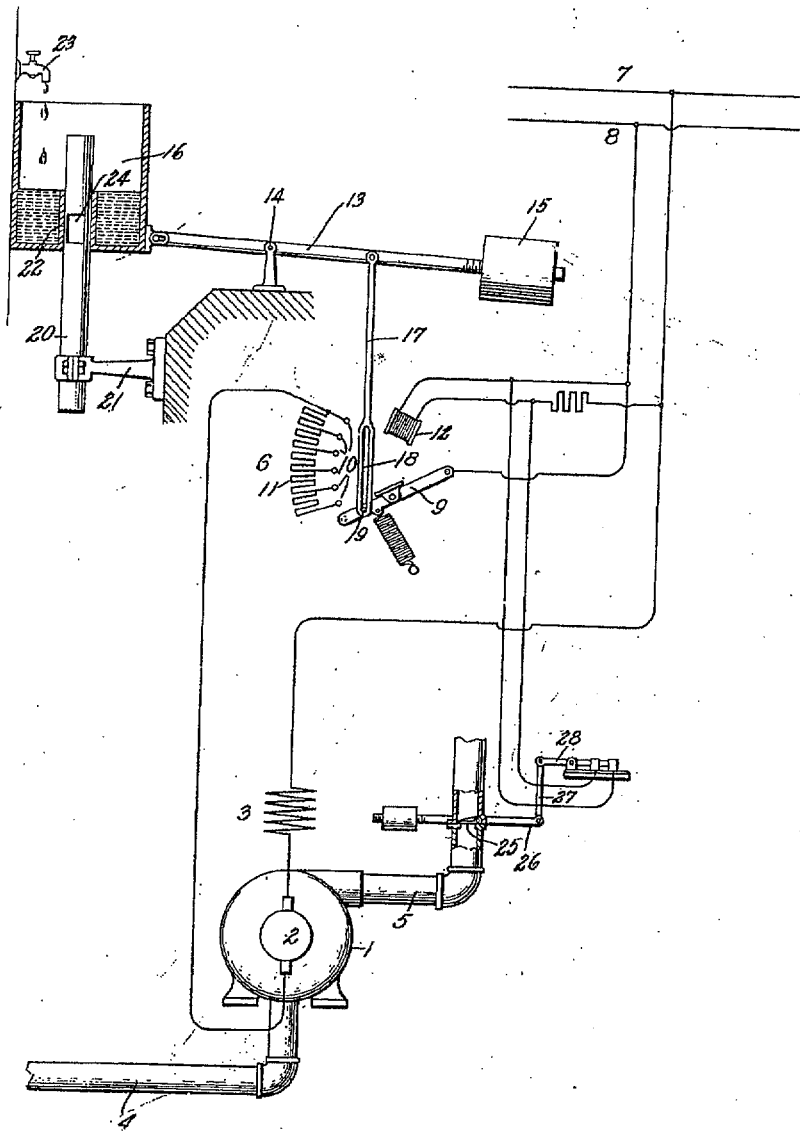
WITNESSES:
George J. Thornton
Helen Oxford
INVENTOR:
Arthur S. Mann,
By Albert S. Dann
Att'y

UNITED STATES PATENT OFFICE.

ARTHUR S. MANN, OF SCHENECTADY, NEW YORK, ASSIGNOR TO GENERAL ELECTRIC COMPANY, A CORPORATION OF NEW YORK.

CONTROL SYSTEM.

No. 868,464.      Specification of Letters Patent.      Patented Oct. 15, 1907.

Application filed December 18, 1905. Serial No. 292,130.

*To all whom it may concern:*

Be it known that I, ARTHUR S. MANN, a citizen of the United States, residing at Schenectady, county of Schenectady, State of New York, have invented certain new and useful Improvements in Control Systems, of which the following is a specification.

The object of the present invention is to produce a simple and efficient system of control for automatically governing apparatus which is called upon to perform work intermittently and in varying amounts. An example of this character of apparatus is to be found in steam heating systems wherein the condensed steam which collects in the various pipes throughout the system is returned to the boilers by means of a power driven pump. If it is desired to maintain the pipes fairly clear of water it is necessary that the pump shall be at all times ready to operate in order to carry away any accumulation of water. It is evident that under the varying conditions of temperature and service of an extended heating system the rate at which the water collects in the pipes is an extremely variable quantity, and if a pump of sufficient capacity to take care of the maximum accumulation is operated continuously, then, when the rate of accumulation is small, the pump must necessarily at times run substantially on no load, and in any event on very light loads. If, on the other hand, a pump capable of disposing of the average accumulation of water is employed, then at times it will be insufficient to keep the pipes clear. In order that a pump sufficiently large to take care of a maximum accumulation of water may be employed without being required to run on extremely light loads, I have devised means whereby the pump is operated intermittently, the starting of the pump being automatic and being effected at any desired predetermined intervals of time, together with means controlled by the discharge of the pump for again stopping the pump when there is but little water passing through the pump. I prefer to employ an electric motor for operating the pump and to control the starting and stopping of the pump by starting and stopping the motor.

Thus it will be seen that in one of its aspects the present invention may be considered as relating to means for starting a motor at predetermined intervals of time and automatically stopping the motor if and whenever the motor load falls below a predetermined value.

In another aspect the present invention may be considered as comprising a power driven pump, together with controlling apparatus for starting the pump at predetermined intervals of time and determining the duration of operation of the pump by the rate of discharge.

The present invention, in the above and other of its aspects, will be more fully understood and further objects thereof will appear from the following description.

In the accompanying drawing I have illustrated diagrammatically one form of the present invention, and similar reference characters appearing on said drawing and in the following description denote like parts.

Referring to the drawing, 1 indicates a pump driven by a motor having an armature 2 and a field winding 3; 4 is the suction pipe; 5 the discharge pipe; 6 is a starting switch of any usual or desired type arranged to connect the motor to a source of current supply indicated by lines 7 and 8 and to vary the resistance of the motor circuit in starting in the usual manner. The rheostat is illustrated as consisting of a spring actuated arm 9 arranged to sweep over contacts 10 connected at various points along resistance 11, together with an electromagnet 12 adapted to maintain the arm 9 in its full "on" position after the arm has been brought to that position.

The present invention contemplates means for automatically operating the rheostat at predetermined intervals of time, thereby causing the motor to be set in operation at the same intervals. It is of course evident that the means for so operating the rheostat may be varied, since the present invention is not limited to any particular apparatus for accomplishing this end. The arrangement illustrated for this purpose consists of a lever 13 pivoted at 14 upon a fixed support and carrying at one end a weight 15 and at the other end a receptacle 16. An arm 17 is connected to the lever 13 at a point intermediate the pivotal support of the lever and the weight 15, and at its lower end this arm is provided with a slot 18 into which projects a pin 19 extending from the arm 9. The length of the slot 18 is such that when the parts are in the position shown the arm 9 is free to be moved between its extreme limits. Extending through the bottom of the receptacle 16 is a pipe 20 suitably supported on a bracket 21. The receptacle is preferably provided with an elongated flange or gland 22 so as to make a water-tight joint between the pipe and the receptacle while at the same time permitting relative axial movements between the two. Arranged above the receptacle is a cock 23 receiving water or other liquid from any suitable source. By opening this cock, liquid flows into the receptacle and, by varying the extent of opening, the rate of flow may be varied at will. The interval elapsing between successive closings of the starting rheostat is determined by the rate at which the liquid flows from the cock 23 and therefore this interval may be varied to suit the requirements of the existing conditions.

Assuming that the parts are in the position shown, the water or other fluid will flow into the receptacle 16 until the receptacle and contained fluid overbalances the weight 15, whereupon the receptacle descends and the member 17 moves the rheostat arm into its other extreme position. In descending, the receptacle uncovers an opening 24 in the pipe 20 and the fluid is discharged through this opening until the partially emptied receptacle is overbalanced by the weight 15 and the receptacle rises again to the position shown. If in the meantime the electromagnet 12 has become energized, the rheostat arm will be held in its running position, but if not, then the rheostat opens concurrently with the ascent of the receptacle. Thus the motor is set in operation at regular intervals through the action of the time operating mechanism; so that after the pump has been brought to rest in the manner to be hereinafter described it need not necessarily remain idle longer than the period elapsing before the next operation of the rheostat.

The duration of operation of the motor is made to depend upon the amount of work to be done, and to this end I have provided means depending upon the rate of discharge of the pump for controlling the maintaining magnet of the rheostat, so that after the rheostat has been set and the motor started, the motor will immediately come to rest upon the ascent of the receptacle, unless there is sufficient water to be pumped to warrant the continued operation of the pump. It is of course evident that the actual construction and arrangement of parts for carrying out this feature of the present invention may be greatly varied, although the arrangement illustrated provides a simple and effective means for accomplishing the desired result. In the discharge pipe 5 I have arranged a pivoted check valve 25 which, when the pump is operating, swings about its axis to an extent depending upon the rate of discharge of the pump. It will of course be understood that instead of a pivoted check valve a different form of valve or other device subjected to the discharge current may be employed. Connected to the valve so as to oscillate in unison therewith is an arm 26 which is in turn connected by means of link 27 to the movable member of a switch 28. The switch 28, when closed, short circuits the electromagnet 12, and the arrangement is such that when there is no flow, or only a small flow in the discharge pipe of the pump, the switch 28 is closed; but when a predetermined amount of water is being pumped the check valve is opened to such an angle that the switch 28 is made to open, thereby interrupting the short circuit about the magnet 12 and permitting it to be energized.

The operation of the apparatus described is as follows: Assuming that the receptacle 16 has descended, causing the rheostat to be operated, the motor will start up in the usual manner and operate the pump; the rheostat will be held in its operative position momentarily while the receptacle is being emptied; and therefore, if there is sufficient water in the pipe 4 to make it desirable to continue the operation of the pump, ample time is given for the formation of a discharge stream past the check valve and therefore the check valve will be swung about its axis and the switch 28 opened. The opening of the switch 28 allows the electromagnet 12 to become energized so that when the receptacle again ascends the rheostat arm is held in its operative position by the maintaining magnet. The pump now continues to operate until the discharge stream becomes so small that the check valve closes sufficiently to close the switch 28;

this instantly deënergizes the maintaining magnet and allows the rheostat to open. The operating member 17 for the rheostat is moved up and down at regular intervals without producing any effect upon the apparatus as long as the rheostat is held closed by its maintaining magnet; but upon the first and every succeeding operation of the rheostat actuating member following the deënergization of the maintaining magnet, the rheostat arm is brought into its operative position and the pump caused to operate for a short period. However, after each operation the switch arm is moved to its open position upon its release by the actuating member, until such a time when the discharge stream produced during one of the momentary operations of the pump becomes sufficiently great to cause the switch 28 to open; whereupon the rheostat arm will be held in the closed position by the maintaining magnet until the load on the pump drops below the point at which it is desirable to maintain the pump in operation.

Although I have illustrated and described the present invention as embodied in one form only, I do not desire to be limited to the specific form shown or to any specific form except as specifically indicated in the appended claims.

What I claim as new and desire to secure by Letters Patent of the United States, is,—

1. In combination, a motor, a source of current supply, a switch for completing a circuit from said source of supply through said motor, means for closing said switch at predetermined intervals, and means controlled by the load on the motor for maintaining said switch closed.

2. In combination, a motor, a starting rheostat therefor, means for automatically operating said rheostat at predetermined intervals, and means controlled by the load on the motor for maintaining the rheostat in its operated position.

3. In combination, a motor, a normally open starting rheostat therefor, means for operating said rheostat at predetermined intervals to close the motor circuit and vary the resistance in said circuit, and means controlled by the load on the motor for maintaining said rheostat in its operated position.

4. In combination, a motor, a source of current supply, a switch for completing a circuit from said source of current supply through said motor, means for automatically operating said switch and holding it momentarily in its operated position at predetermined intervals of time to complete the motor circuit, and means controlled by the load on the motor for maintaining said switch in its operated position.

5. In combination, a motor, a source of current supply, a switch for completing a circuit from said source of supply through said motor, means for automatically operating said switch and holding it momentarily in its operated position at predetermined intervals to complete the motor circuit, and means for maintaining said switch in its operated position when the load on the motor exceeds a predetermined value.

6. In combination, a motor, a source of current supply, a normally open starting rheostat for completing a circuit through said motor from said source of supply and varying the resistance in the motor circuit, means for automatically operating said rheostat and holding it momentarily in its operated position at predetermined intervals, means for maintaining said rheostat in its operated position, and means controlled by the load on the motor for rendering the aforesaid means inoperative to maintain the rheostat in its operative position when the load on the motor is less than a predetermined value.

7. In combination, a motor, a source of current supply, a normally open starting switch for completing a circuit through said motor from said source of supply, means for automatically operating said starting switch and holding it momentarily in its operated position at predetermined intervals, an electromagnet for maintaining said starting switch in its operated position, and a switch controlled by the load on the motor for deënergizing said electromagnet when the load on the motor is less than a predetermined value.

8. In combination, a motor-driven pump, a source of current supply, a starting switch for completing a circuit from said source of supply through the pump motor, means for automatically operating said switch at predetermined intervals, and means controlled by the discharge from said pump to maintain said switch in its operative position.

9. In combination, a motor-driven pump, a source of current supply, a starting switch for completing a circuit from said source of supply through the pump motor, means for automatically operating said starting switch and holding it momentarily in its operative position at predetermined intervals of time, and means controlled by the discharge from said pump for maintaining said switch in its operative position.

10. In combination, a motor-driven pump, a source of current supply, a starting switch for completing a circuit from said source of supply through the pump motor, means for automatically operating said starting switch at predetermined intervals of time, maintaining means for said starting switch, and means controlled by the discharge from said pump for controlling said maintaining means.

11. In combination, a motor-driven pump, a source of current supply, a starting switch for completing a circuit from said source of current supply through the pump motor, maintaining means for said starting switch, and means controlled by the discharge from said pump for rendering said maintaining means inoperative when said discharge is below a predetermined value.

12. In combination, a motor-driven pump, a normally open switch for completing the circuit of the pump motor, means for closing said switch at predetermined intervals of time, an electromagnet for maintaining said switch closed, and a switch controlled by the discharge from said pump for controlling said electromagnet.

13. In combination, a motor-driven pump, a normally open switch for completing a circuit through the pump motor, means for closing said switch at predetermined intervals, an electromagnet for maintaining said switch closed, a switch for deënergizing said electromagnet, and means controlled by the discharge from said pump to operate said latter switch to deënergize said electromagnet when the discharge from said pump is below a given value.

14. In combination, a motor-driven pump, a source of current supply, a starting switch for completing a circuit from said source of current supply through the pump motor, means for automatically operating said switch at predetermined intervals, a member responsive to the discharge from said pump, and means controlled by said member for maintaining said switch in its operative position.

15. In combination, a motor-driven pump, a switch for completing a circuit through the pump motor, means for operating said switch at predetermined intervals of time, maintaining means for said switch, a valve on the discharge side of said pump, and means associated with said valve for controlling said maintaining means.

16. In combination, a motor-driven pump, a starting switch for completing a circuit through the pump motor, means for operating said switch at predetermined intervals of time, electromagnetic maintaining means for said starting switch, a check valve on the discharge side of said pump, and a switch operatively connected to said check valve and arranged to render said maintaining means inoperative when the check valve is closed a predetermined amount.

17. In combination, a motor-driven pump, a source of current supply, a normally open starting rheostat adapted to complete a circuit through the pump motor and vary the amount of resistance in the motor circuit, means for operating said rheostat at predetermined intervals of time, electromagnetic maintaining means for said rheostat, a check valve on the discharge side of said pump, and a switch operatively connected to said check valve for deënergizing said maintaining means when the opening of the check valve drops below a predetermined amount.

18. In combination, a pump, driving mechanism for said pump, means for setting said driving mechanism in operation at predetermined intervals of time, and means controlled by the rate of discharge of said pump for stopping the operation of said driving mechanism.

19. In combination, a pump, driving mechanism for said pump, means for setting said driving mechanism in operation at predetermined intervals of time, and means for automatically stopping said driving mechanism when the rate of discharge from said pump falls below a given value.

20. In combination, a pump, driving mechanism for said pump, means for automatically setting said driving mechanism in operation at predetermined intervals of time, a device actuated by a flow of fluid on the discharge side of the pump, and means controlled by said device for stopping said driving mechanism.

21. In combination, a motor-driven pump, a source of current supply, a starting switch for completing a circuit from said source of current supply through the pump motor, and means controlled by the discharge from said pump for causing said starting switch to open when said discharge is below a predetermined value.

22. In combination, a motor-driven pump, a source of current supply, a switch for completing a circuit from said source of current supply to the pump motor, a check-valve on the discharge side of the pump, and means controlled by said check-valve for causing said switch to open.

In witness whereof, I have hereunto set my hand this 15th day of December, 1905.

ARTHUR S. MANN.

Witnesses:
BENJAMIN B. HULL,
HELEN ORFORD.